UNITED STATES PATENT OFFICE.

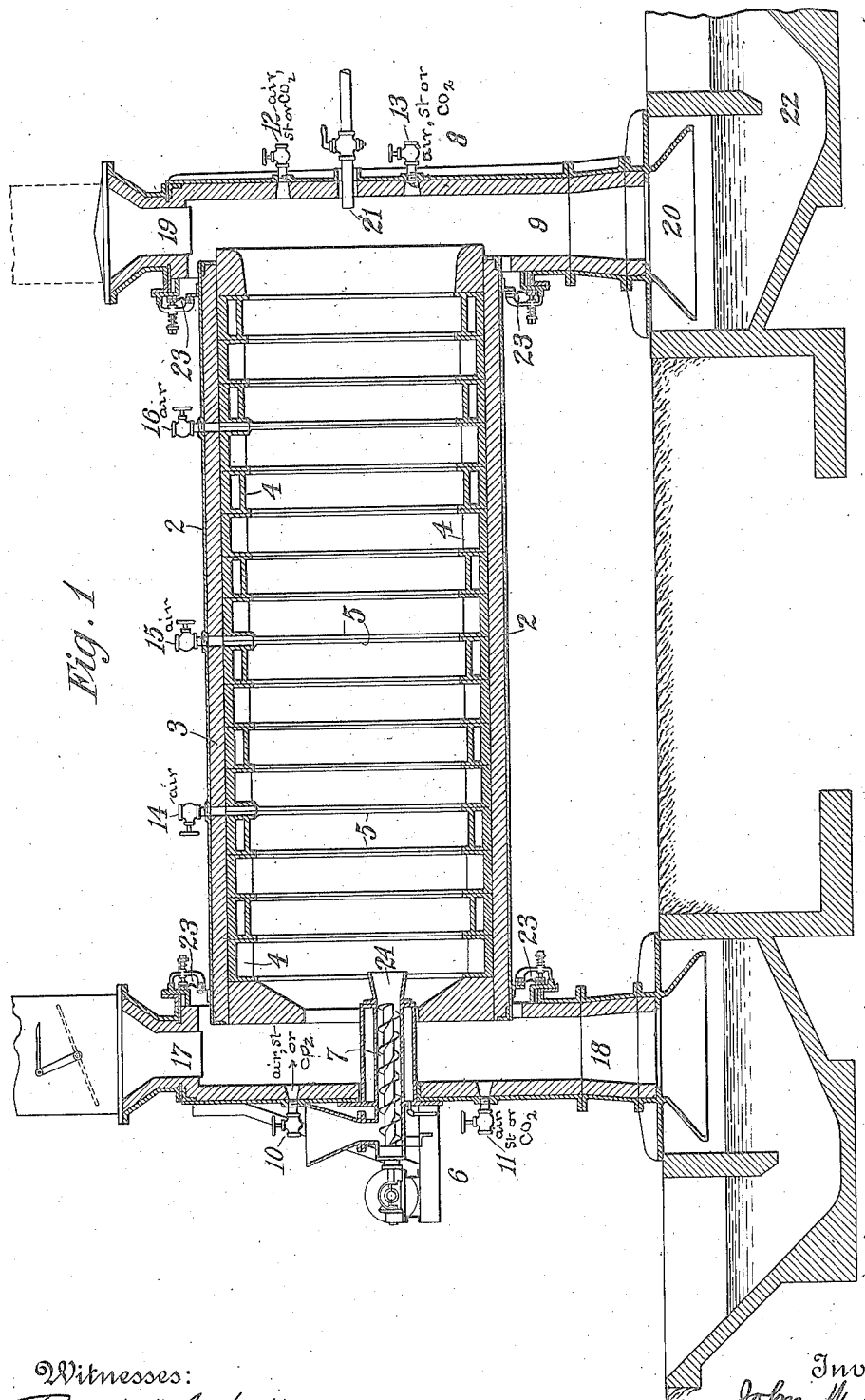

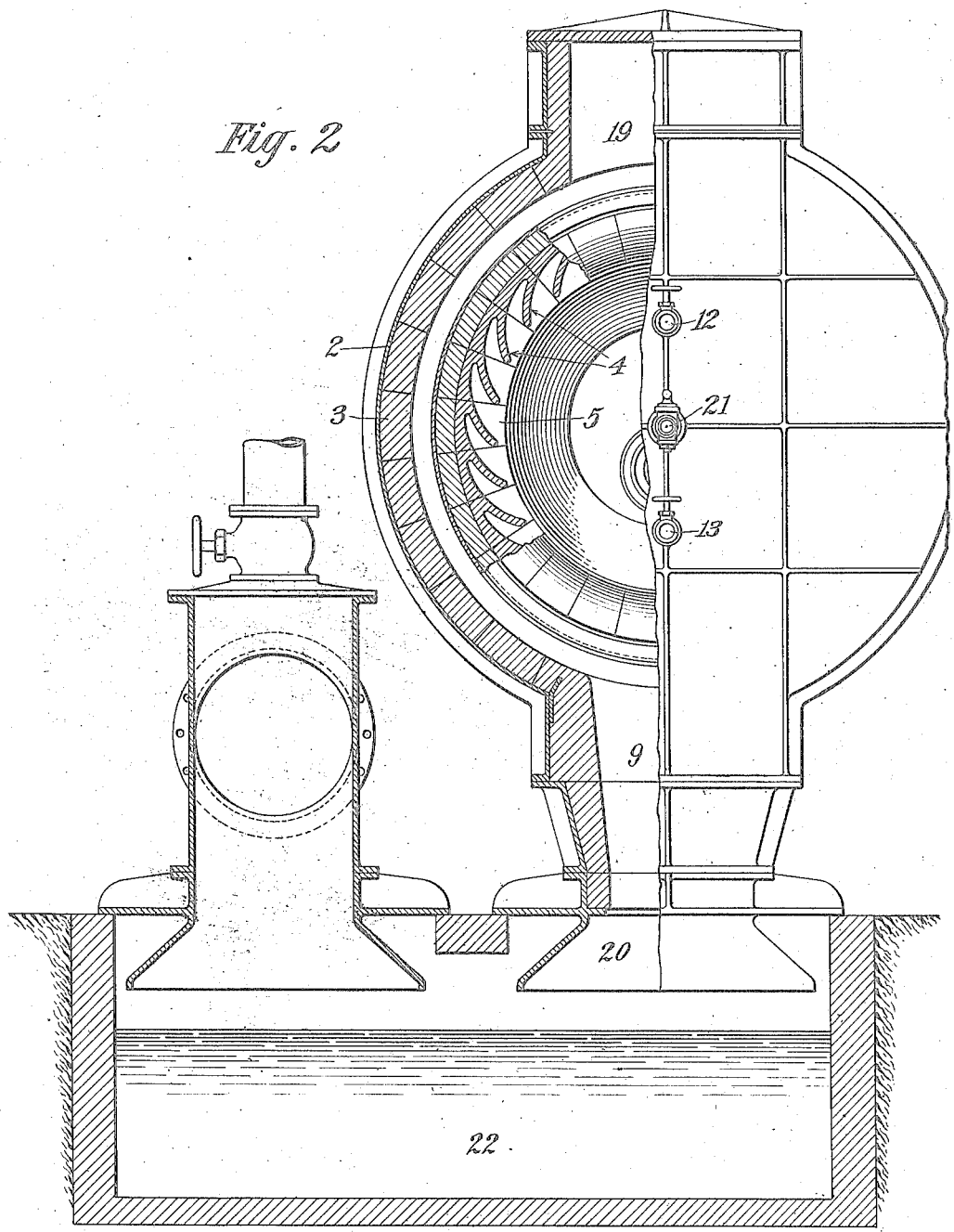

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

METHOD OF MAKING PRODUCER-GAS.

1,270,949.  Specification of Letters Patent.  Patented July 2, 1918.

Application filed October 9, 1911, Serial No. 653,522. Renewed November 24, 1917. Serial No. 203,861.

*To all whom it may concern:*

Be it known that I, JOHN W. HORNSEY, a citizen of the United States, and a resident of Summit, Union county, New Jersey, have invented a new and Improved Method of Making Producer-Gas, of which the following is a specification, reference being had to the accompanying drawings, in which—

Figure 1 is a sectional elevation of apparatus for use in carrying out my invention, and Fig. 2 is an end elevation partly in section of Fig. 1.

My invention relates to the manufacture of producer gas, and my method is designed to effect this in a continuous operation, in which the material utilized is continuously and repeatedly passed through a heated agitated zone, the various particles of the material being repeatedly separated each from the others and brought into contact with the heated gases in the heated zone in such fashion as to expose the greatest amount of surface to chemical reaction, which is thereby expedited and rendered more efficient. By this method I am enabled to recover a much higher percentage of heating values than by processes heretofore used, and the apparatus which I employ is much simpler and more durable than that used in the prior practices. As I am able to continuously feed the material, to continuously withdraw the ash, to maintain the temperatures which are most efficient in producing the desired reactions, and also to constantly supply and maintain the material utilized in a state of constantly agitated sub-division, the gas resulting from the employment of my process is much more uniform than that heretofore produced.

A further object of my invention is to produce a gas substantially free from tar, such as is particularly suitable for use in gas engines, in which the presence of tar is very detrimental.

A further object is the utilization of finely divided fuels.

Referring to the drawings, in which I have shown a typical or preferred type of apparatus to be used in carrying out my invention, 2 is a metal shell or cylinder adapted to be rotated by any well-known means and preferably inclined from its feed end to its discharge end. This cylinder has a refractory lining 3; projecting from the surface of this lining are buckets 4, adapted to elevate the material, and drop it down through cylinder 2, during the rotation thereof, in a substantially, uniformly distributed shower, these buckets 4 being located between the transverse ribs or rings 5. At the feed end 6 of the vessel is a conveyer 7 by which the material is admitted, and at the discharge end 8 is an off-take 9, from which the waste material is discharged. 10, 11, 12 and 13 are openings in the ends 6 and 8 through which an oxygen bearing agent such as air, steam or carbon dioxid, may be admitted to the apparatus, and 14, 15 and 16 are inlet ports in the wall of the cylinder 2, and show one means through which an oxygen bearing or temperature controlling agent such as atmospheric air may be admitted, if desired, to assist in the regulation of the reactions and temperatures. 17, 18, 19 and 20 are outlets for the gas, various ones of which may be used as desired. 21 is a gas burner which may be used as a starting device. 22 is a settling basin, in which the ash or waste is deposited. 23 are seals or flexible joints to prevent the entrance or leakage of air or gas between the moving cylinder 2 and the stationary ends 6 and 8. 24 is the outlet of the conveyer 7, and is so designed that it will always contain a sufficient quantity of material to prevent any leakage through the conveyer.

It will be seen that my apparatus is of the double ended type, and is capable of being used to carry out my invention in a variety of ways, and I will describe in connection therewith two typical examples of the ways in which my invention may be employed.

First: In producing gas in which it is desired to recover by-products from the fuel, I first pre-heat the cylinder by any suitable means, as by the burner 21, and when the cylinder has reached the desired temperature, I begin to revolve it and to feed a small quantity of coal, or other carbonaceous material, in through the conveyer 7. As this charge reaches the desired temperature I increase the feed of the material to the desired point and continue to revolve the cylinder, at the same time admitting air, and if desired, steam, through the openings 12 and 13 in sufficient quantities to promote partial combustion. The revolution of the cylinder causes the buckets 4 to pick up the material and shower it again and again through the oxidizing agent onto the bottom of the cylinder, exposing the largest possible surface to the reacting elements, which showering action, in connection with the tumbling action in the bottom of the cylinder effectually removes the "ash veil" from the surface of the particles, which otherwise would prevent or retard the desired reaction.

The gas begins to pass off from the material shortly after it is fed into the chamber, and can be led away either through the gas outlets 17 or 18, as desired. The form as shown in 18 enables the gas to release itself from dust which it may carry, since the gas impinges on the surface of the water in the outlet and deposits dust thereon, and the gas substantially free from dust passes onto a suitable receptacle.

After the operation has proceeded far enough to insure the presence of a suitable amount of carbonaceous material in a more or less completely coked or distilled condition, having obtained the requisite degree of heat, I shut off the burner 21 and regulate the flow of air and steam through the openings 12 and 13 so that a highly heated "producer gas" will be formed by the combination of the oxygen of the air and steam with the coked material. Should the temperature fall below that required to produce the desired percentage of carbon monoxid, I reduce the flow of steam, and the combustion of the carbon to carbon dioxid at the lower temperature speedly raises the temperature of the cylinder to that point at which a producer gas containing principally carbon monoxid and hydrogen (diluted with atmospheric nitrogen) is produced. Should the temperature increase to such an extent as to be undesirable, I increase the flow of steam.

The oxidation of the carbon to carbon monoxid is more than sufficient to develop the degree of heat required for the production of the desired percentage of carbon monoxid, and the introduction of the steam has, as is well known, a cooling effect on the cylinder, consequently the gas generated in the cylinder, consequently by properly regulating the flow of air and steam I can decompose the carbon into a producer gas carrying a suitable amount of sensible heat to distil completely the material entering into the cylinder, (where this distillation is not exothermic), and the products of distillation are then carried off by the out-going producer gas to be recovered from it in any well known manner while the ash or waste drops down through the off-take 9 into the settling basin 22, from which it is readily removed.

The oxidizing agent in passing through the cylinder is diffused throughout its cross-sectional area in a substantially uniform volume, and the material is also distributed uniformly so that reactions will take place uniformly throughout the cross-sectional area of the cylinder, and a uniform heat is therefore generated throughout a vertical cross-sectional plane taken at any given point in the length of the cylinder.

Second: When it is desired to produce a tar free gas, the apparatus is operated in the manner which I have specified above, except that the air to promote combustion is introduced through the openings 10 and 11 at the feed end 6, and the gas is withdrawn from either the outlet 19 or 20. If desired, steam can also be introduced with the air, or separately, or in the form of water.

When the apparatus is operated in the manner first described, the gas is withdrawn through outlets 17 or 18; as the fuel travels through the apparatus it is gradually heated, the volatile matter is distilled, and this volatile distillate traveling through and out of the apparatus with the gas, passes through zones of gradually lowering temperature. At no point is it heated above the temperature of distillation, and consequently no chemical or physical change will be effected in the volatile until it leaves the apparatus and is cooled; then, only a physical change results, namely, condensation into tar or oil.

The tar-free gas, however, produced by the second method of operation, is rendered tar-free because the gas is withdrawn through the outlets 19 or 20, in which case the volatile, when distilled before it can reach the outlets, passes through zones of gradually increasing temperatures. This temperature is sufficient, when a proper amount of free oxygen is present, to effect a complete chemical change in the tars and oils, thus changing them chemically as well as physically into a fixed gas.

As in the first operation I have described, the carbonaceous material as it travels from the feed end 6 toward the discharge end 8, gradually rises in temperature; the volatile matter is distilled; and, air is introduced through openings 10 and 11. When the temperature of combination is reached, the oxygen of the air unites with some of the constituents of the material. This develops heat, producing principally carbon dioxid ($CO_2$), but also forming other gases containing hydrogen or carbon and of varying composition, depending upon the relative quantities of combining elements and the temperature of combination. As these gases carrying with them or meeting in their travel the requisite amount of oxygen are led toward the outlets 19 or 20 in a highly heated condition, they react chemically with the shower of falling material through which they must pass in order to reach the said outlets, and in these reactions carbon dioxid unites with carbon, forming carbon monoxid, while some of the other gases are partially decomposed or "cracked", forming simpler hydro-carbon oxidizable gaseous compounds and hydrogen. The tar and other by-products resulting from the initial distillation of the material, where it enters the cylinder, and contained in the gas thereby liberated, are, by the heat of the aforesaid chemical reaction, raised to such a high temperature that they are converted into fixed gases. The combustible constituents of the finally resulting gas are principally carbon monoxid and hydrogen.

In my process I am enabled to use finely divided materials by constantly showering them through the heated zone, thereby obtaining the heat necessary for distillation by contact, rather than by conduction, so that I effect distillation at comparatively low temperatures, insuring an increased yield of by-products. As the finely divided material is dropped by the rotation of the cylinder or rolls over the bottom of the cylinder, the ash adhering to the surface of the particles is broken or rubbed off, and, in consequence, the particles are constantly presenting fresh surfaces to the heating gases until entirely converted into by-products, gas and ash.

It is clear, furthermore, that in the apparatus employed in carrying out my process there is no possibility of the formation of "chimneys" or blow holes, as the fuel is kept constantly and uniformly in motion. Hence, any clinker formed by a fusing ash which agglomerates, will form into comparatively small masses, like the "marbles" from Portland cement kilns, and be automatically discharged without adhering to the interior of the cylinder, or without the necessity of manual breaking. With suitable grades of fuel and under proper temperature conditions the ash may be reduced to fluid form, and allowed to flow or trickle from the cylinder, but whether the ash be discharged as fluid or as "marbles", it is clear that the action will in these cases cause the particles of ash to cohere, thus minimizing the formation of dust and overcoming its accompanying disadvantages.

Obviously in the carrying out of my invention, the fuel is maintained in a uniform condition by reason of the continued revolution of the cylinder by which it is repeatedly picked up from and showered down on the bottom of the cylinder, and passes through the cylinder at a uniform rate of progress. Its travel will not be attended by the building up of "bridges" "side ridges" or like formations of clinker or ash, since the uniform action of the fuel renders the occurrence of such a condition impossible. This uniform condition and constant motion of fuel, moreover, renders unnecessary any manual disturbance or "poking" of the fuel during operation.

It is obvious that the temperature and location of the heated zone may be so controlled that the ash may be discharged at whatever temperature is deemed most desirable.

Where it is desired to use steam as the oxygen bearing agent, it may be introduced either as such or in the form of water or water vapor. I may also inject oil, tar or other liquid hydrocarbons at any suitable point in the apparatus. It is clear, also that where the carbonaceous material is fed in uniformly, and the gas and ash withdrawn at a constant rate, the quality and composition of the gas can obviously be maintained in a much more uniform condition than where any or all of these operations are intermittent.

A further advantage that I obtain is that by means of the separation of the particles of the material the velocity of the oxidizing agent in traveling through the material is decreased, and the time of contact with the material is correspondingly increased, so that the resulting reaction is accordingly rendered more efficient.

In my process the material is repeatedly passed through the oxidizing agent, and the oxidizing agent is repeatedly brought into contact with the material, thus overcoming any irregularity in the chemical reactions which would result from a single or partial contact of the oxidizing agent and the material. I am also enabled to utilize a finely divided fuel such as slack, coke breeze or sawdust; or one which disintegrates upon heating, such as lignite, or peat, because the oxidizing agent will readily pass through the showering particles of such a substance, which in my process has no opportunity to cake or agglomerate. As some of these fuels contain a large percentage of by-products, the advantages to be gained by their utilization are very apparent, and, in any case, I believe that my process of utilizing such finely divided fuels by bringing them repeatedly into contact with an oxidizing agent, while in a state of constant agitation, is broadly new.

In carrying out my process, I am enabled to cause the material to travel repeatedly through a path substantially at right angles with the axis of the cylinder and with the path of flow of the oxidizing agent, thereby greatly increasing the length of travel of the material through said oxidizing agent, and causing the oxidizing agent in its travel to be repeatedly baffled by the moving particles of the material, and the amount of material with which any given quantity of the oxidizing agent comes into contact is likewise increased.

While I have described two typical ways of carrying out my process, it is understood that many changes may be made therein by those skilled in the art, without departing from the spirit of my invention.

What I desire to claim is —

1. The process of continuously making producer gas from carbonaceous material, which consists in introducing carbonaceous material into a heated revolving vessel, causing the material to be retarded in its travel through the vessel and to be picked up and showered down in the interior of the vessel to maintain the material in a finely divided and comminuted condition, introducing an oxidizing agent into the vessel while it is being revolved, thus exposing the separated particles of the material to the action of the oxidizing agent and the heat, the shock of the falling particles being adapted to disrupt their seared surfaces and to present fresh surfaces to the action of the heat and oxidizing agent with each revolution of the vessel, the material and the oxidizing agent being introduced into the vessel continuously.

2. The process of continuously making producer gas, which consists in continuously introducing carbonaceous material and an oxidizing agent into a heated vessel, retarding the travel of the material through the vessel, repeatedly elevating it, thereby maintaining the particles of the material in a series of falling showers down through the vessel, whereby each particle has all of its surfaces repeatedly exposed to the action of the heat and the oxidizing agent, the seared surfaces of the particles being again and again broken off and fresh surfaces being again and again presented to the action of the heat and the oxidizing agent, whereby gasification of the material is substantially completed.

3. The process of continuously making producer gas, which consists in continuously introducing carbonaceous material and an oxidizing agent into a closed vessel in the presence of heat, constantly agitating the material to maintain it in a finely subdivided and comminuted condition by interrupting its travel through the vessel, and by repeatedly picking it up and dropping it down through the oxidizing agent in substantially uniform showers of individual particles whereby the oxidizing agent is baffled by said particles, and a thorough contact of the material with the heat and the oxidizing agent is insured.

4. The process of continuously making producer gas, which consists in continuously introducing carbonaceous material and an oxidizing agent into a closed vessel in the presence of heat, constantly agitating the material to maintain it in a finely divided condition by repeatedly picking it up and dropping it in a plurality of series of showers, the shower of one series falling out of alinement with the showers of an adjacent series, whereby the oxidizing agent is baffled by said particles and a thorough contact of the material with the heat and oxidizing agent insured.

JOHN W. HORNSEY.

Witnesses:
ANNA GREENBERG,
S. A. HASBROUCK.